(12) United States Patent
Iijima et al.

(10) Patent No.: US 11,346,394 B2
(45) Date of Patent: May 31, 2022

(54) BEARING DEVICE AND CONSTRUCTION MACHINE

(71) Applicant: Caterpillar SARL, Geneva (CH)

(72) Inventors: Seiji Iijima, Akashi (JP); Naoki Miyata, Akashi (JP); Kazufumi Nishimoto, Akashi (JP); Yasunori Komatsubara, Akashi (JP); Yuma Yabuki, Tokyo (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/266,584

(22) PCT Filed: Aug. 5, 2019

(86) PCT No.: PCT/EP2019/025256
§ 371 (c)(1),
(2) Date: Feb. 6, 2021

(87) PCT Pub. No.: WO2020/030296
PCT Pub. Date: Feb. 13, 2020

(65) Prior Publication Data
US 2021/0293271 A1    Sep. 23, 2021

(30) Foreign Application Priority Data
Aug. 6, 2018    (JP) .............................. JP2018-147895

(51) Int. Cl.
*F16C 17/02*    (2006.01)
*F16C 33/74*    (2006.01)

(52) U.S. Cl.
CPC .............. *F16C 17/02* (2013.01); *F16C 33/74* (2013.01); *F16C 2350/26* (2013.01)

(58) Field of Classification Search
CPC .... F16C 11/045; F16C 11/1702; F16C 17/26; F16C 33/74; F16C 2350/26; E02F 3/36; E02F 9/006
See application file for complete search history.

(56) References Cited

U.S. PATENT DOCUMENTS

| 4,398,862 A | 8/1983 | Schroeder |
| 6,877,259 B2 | 4/2005 | Nishimura et al. |

(Continued)

FOREIGN PATENT DOCUMENTS

| JP | H0256764 U | 4/1990 |
| JP | H0366912 A | 3/1991 |

(Continued)

OTHER PUBLICATIONS

International Search Report for related Appiication No. PCT/EP2019/025256; reported Oct. 16, 2019.

*Primary Examiner* — James Pilkington (57) ABSTRACT

A bearing device that includes a large-diameter section that is provided on a shaft and regulates an axial position of a collar relative to the shaft. The bearing device has a bearing that rotatably retains the shaft at a position outside of a boss section, and has a cylindrical bearing member opposed to the opposing section of the collar at one end. The bearing device includes a floating seal for sealing a lubricant which is sandwiched between the opposing section of the collar and the one end of the bearing member. The bearing device includes a mounting member mounted to the end of the shaft and positioned on the other end of the bearing member to regulate the axial position of the bearing relative to the shaft.

4 Claims, 4 Drawing Sheets

(56) References Cited

U.S. PATENT DOCUMENTS 9,556,902 B2 * 1/2017 Blunier ................ F16C 11/045
2008/0138005 A1 6/2008 Aira et al.

FOREIGN PATENT DOCUMENTS

| JP | 2002309619 | * | 10/2002 |
| JP | 2004092115 | A | 3/2004 |
| JP | 200875382 | * | 4/2008 |
| JP | 200924837 | * | 2/2009 |
| WO | 2006080242 | A | 8/2006 |

* cited by examiner

BEARING DEVICE AND CONSTRUCTION MACHINE

This patent application is a 35 USC § 371 U.S. national stage of International. Application No. PCT/EP2019/025256 filed on Aug. 5, 2019, which claims the benefit and priority of Japanese Application No, 2018-147895 filed on Aug. 6, 2018, the disclosures of which are incorporated in their entirety by reference herein.

TECHNICAL FIELD

The present invention relates to a bearing device having a bearing that rotatably retains a shaft body, and a construction machine equipped with the same.

BACKGROUND ART

A front working machine of a construction machine has a plurality of shaft sections, and lubrication and protection of the shaft sections requires periodic grease supply. However, since the grease supply operation requires time, it is desired to extend grease supply intervals to a longer period of time and to achieve maintenance-free which dispenses with the need for the grease supply itself.

There is known a configuration in which grease is encapsulated in a lubrication part using a floating seal as a means for making maintenance-free. In this configuration, for example, one boss section is fitted and fixed to a boss hole of one bracket, and the other boss section is fixed to one end of the shaft body and is fitted to a boss hole of the other bracket. The floating seal is mounted to a sealing groove provided on an opposing face of these both boss sections and the sleeve and the other boss section is mounted detachably to the other bracket in a state in which an axial initial compressive load is applied in order to cause the floating seal to achieve sealability (refer to Patent Literature 1, for example).

PRIOR ART LITERATURES

Patent Literatures

[PATENT LITERATURE 1] Japanese Unexamined Utility Model Application Publication No. 1985-24928

SUMMARY OF THE INVENTION

Problems to be Solved by the Invention

In a case of the above configuration, there is a possibility that a desired axial initial compression load cannot be applied, if a dimensional accuracy between the brackets is not good. For example, if the dimension between the brackets is wider than expected, the clearance cannot be reduced even if mounting screws of the boss section are tightened to a maximum torque, and thus a sufficient compressive load cannot be applied to the floating seal and sealability cannot be obtained easily.

In particular, a front working machine of a construction machine is often a welded structure, and it is not easy to finish fine dimensions correctly due to thermal strain caused by welding. In such a case, it is necessary to make a mounting surface so that correct dimensions can be finally obtained by machining such as cutting, but the machining takes time and cost.

The present invention was made in the light the circumstanced described above, and it is an object of the present invention to provide a bearing device which can ensure sealability by a sealing member and eliminates the need for additional supply of lubricant for a long period of time, and a construction machine equipped with the same.

Means for Solving the Problems

In one aspect of the present disclosure a bearing device is disclosed. In an embodiment, the bearing device may comprise a cylindrical section; a shaft body inserted into the cylindrical section; a cylindrical retaining member having a main section mounted to the shaft body and internally inserted into the cylindrical section, and an opposing section located outside with respect to the cylindrical section; a regulating section provided on the shaft body, and configured to regulate an axial position of the retaining member relative to the shaft body; a cylindrical bearing member having a bearing configured to rotatably retain the shaft body at a position outside of the cylindrical section, with one end thereof being positioned in a position opposed to the opposing section of the retaining member; a sealing member for sealing a lubricant, which is sandwiched between the opposing section of the retaining member and the one end of the bearing member; and an mounting member mounted to the end of the shall body from the other end side of the bearing member, configured to regulate the axial position of the bearing member relative to the shaft body.

In a refinement, the bearing device may further include a lid for covering the other end of the bearing member; and an end sealing member for sealing a clearance between the lid and the bearing member.

In a refinement of the embodiment or refinement above, bearing device may further include an inner sealing member for sealing a contact part between the shaft body and the retaining member.

In another aspect of the disclosure, a construction machine is disclosed. The construction machine may include the above embodiment of the bearing device, or the above embodiment of the bearing device and any one or more refinements of such embodiment.

Advantageous Effects of the Invention

According to one embodiment of the present disclosure, the retaining member is mounted on the shaft body inserted into the cylindrical section, the axial position of the retaining member relative to the shaft body is regulated by the regulating section, the sealing member is sandwiched between the one end of the bearing member having the bearing which rotatably retains the shaft body at the position outside of the cylindrical section and the opposing section of the retaining member opposed thereto, and the positional relationship at which the axial load can be applied to the sealing member is fixed, by the position of the regulating section that easily achieves dimensional accuracy, the axial length of the retaining member, the axial length of the bearing member, and the length of entire shaft body, in order to mount the mounting member on the end of the shaft body from the other end side of the bearing member to regulate the axial position of the bearing member relative to the shaft body, and then the axial load required for the sealing member can be applied and maintained by pressing the beating member against the retaining member side by the mounting member. Therefore, the sealability by the sealing member can be secured, and the space of the bearing member where the bearing is situated is enclosed, and the additional supply of the lubricant to the bearing for a long period of time becomes unnecessary.

According to a refinement of the above embodiment of the present disclosure, the other end of the bearing member is covered with the lid, and the clearance between the lid and the bearing member is sealed with the end sealing member, so that the lubricant can be prevented from leaking out of the other end of the bearing member, and the lubricant filled in the space, where the beatings is situated, can be sealed more reliably.

According to a refinement of any one of the above embodiment or above refinement, the lubricant filled in the space, where the bearings is situated, can be sealed more reliably, by sealing the contact part between the shaft body and the retaining member by the inner sealing member.

According to an aspect of the present disclosure, the construction machine that includes the bearing device disclosed herein is easy to maintain and can be provided at low cost.

DESCRIPTION OF EMBODIMENTS OF THE INVENTION

Hereinafter, the present invention will be described in detail based on one embodiment illustrated in FIGS. 1 to 5.

Figure 5:
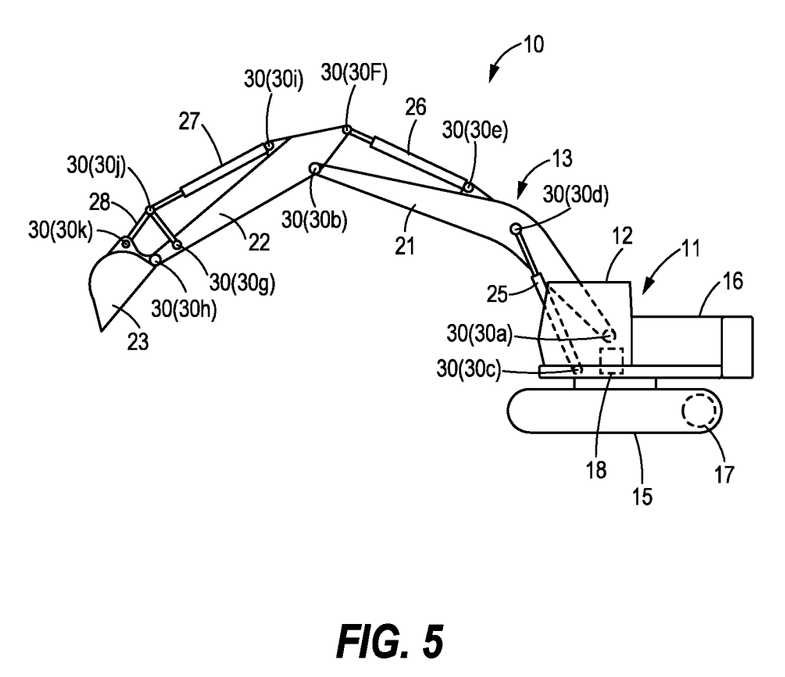
FIG. 5 is a side view illustrating a construction machine equipped with the above bearing device.

FIG. 5 illustrates a hydraulic shovel type construction machine 10. The construction machine 10 includes a machine-body 11, a cab 12, and a working device 13 which serves as a front working machine.

The machine-body 11 includes a lower traveling structure 15 and an upper revolving structure 16 rotatably provided on the lower traveling structure 15. The machine body 11 is equipped with a traveling motor 17 for driving the lower traveling structure 15. The machine body 11 is also equipped with a revolving motor 18 for driving the upper revolving structure 16.

The cab 12 and the working device 13 are each mounted on the machine body 11 (the upper revolving structure 16). The working device 13 includes a boom 21 which serves as a first connected body, an arm 22 forming a stick which serves as a second connected body, and a bucket 23 which serves as a third connected body. In addition, the working device 13 includes paired boom cylinders 25 which serve as a fourth connected body, an arm cylinder 26, forming a stick cylinder which serves as a fifth connected body, and a bucket cylinder 27 which serves as a sixth connected body.

The boom 21 is pivotally supported by the upper revolving structure 16 so as to be rotatable in the vertical direction at its proximal end. The arm 22 is pivotally supported at the distal end part of the boom 21. The bucket 23 is pivotally supported at the distal end of the arm 22 via a linkage 28 which serves as a seventh connected body. Then, the boom 21 is rotated by the boom cylinders 25, the arm 22 is rotated by the arm cylinder 26, and the bucket 23 is rotated by the bucket cylinder 27. In other words, bearing devices 30 are used at a plurality of positions for the working device 13 of the present embodiment. In the present embodiment, bearing devices 30a to 30k are used, for example, at a connecting part between the proximal end of the boom 21 and the upper revolving structure 16, a connecting part between the distal end of the boom 21 and the proximal end side of the arm 22, a connecting part between the proximal end side of the boom cylinder 25 and the upper revolving structure 16, a connecting part between the distal end side of the boom cylinder 25 and the boom 21, a connecting part between the proximal end of the arm cylinder 26 and the boom 21, a connecting part between the distal end of the arm cylinder 26 and the proximal end side of the arm 22, a connecting part between the distal end of the arm 22 and the linkage 28, a connecting part between the distal end of the arm 22 and the bucket 23, a connecting part between the proximal end of the bucket cylinder 27 and the arm 22, and a connecting part between the distal end of the bucket cylinder 27 and the linkage 28, and a connecting part between the linkage 28 and the bucket 23. Hereinbelow, the bearing device 30 of the present embodiment will be described taking the bearing device 30d as an example, but it can be used also as a bearing device of another construction machine, such as, for example, a wheel loader.

Figure 1:
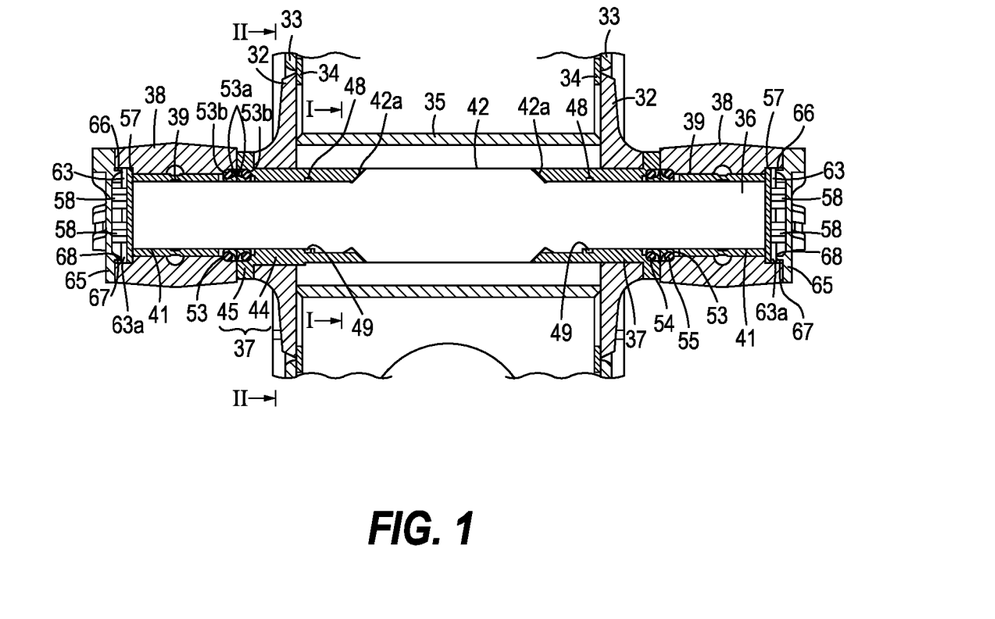
FIG. 1 is a cross-sectional view of an embodiment of a bearing device according to the present invention.
Figure 4:
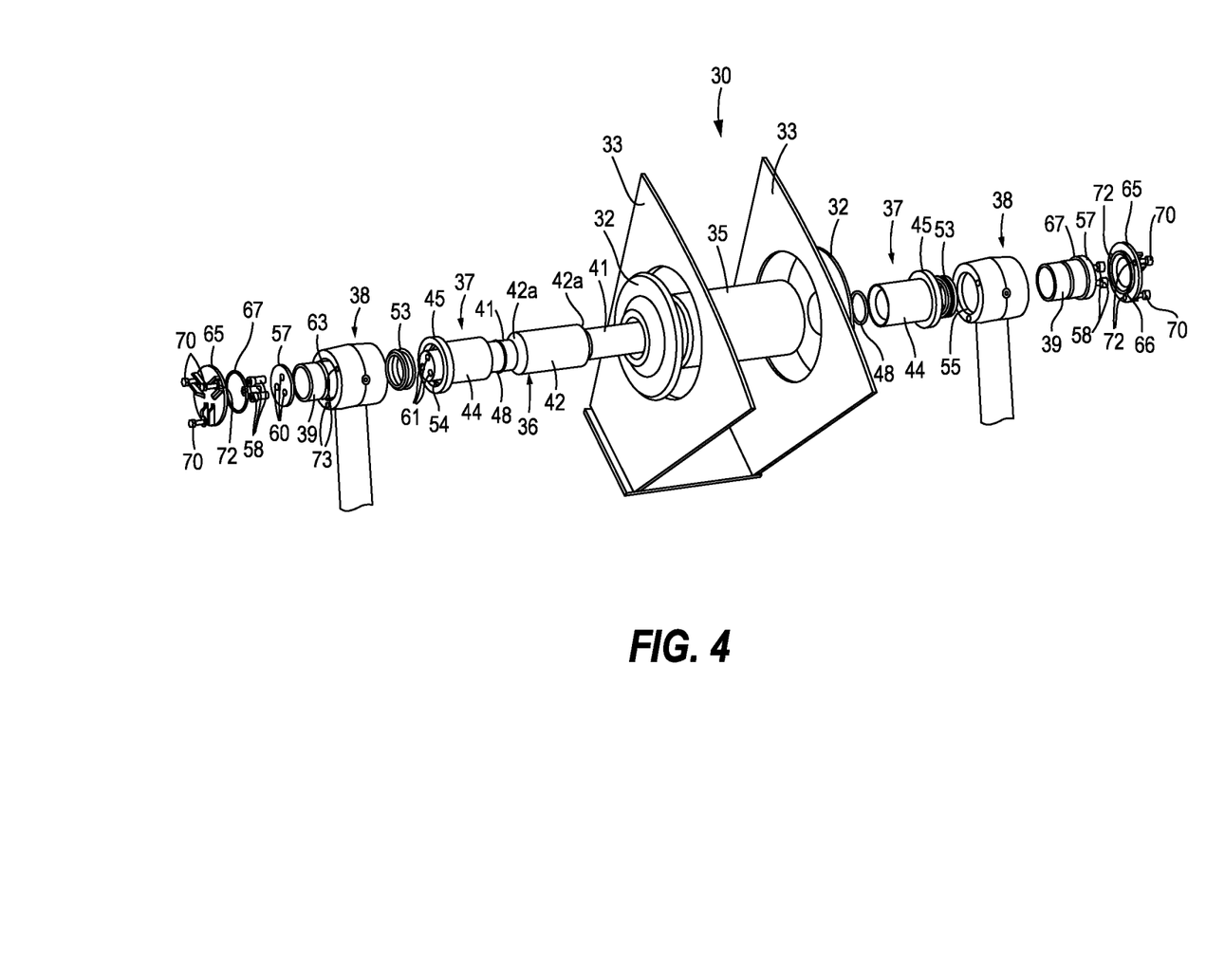
FIG. 4 is an exploded perspective view illustrating the above bearing diagram.

The bearing device 30 is intended for use in the construction machine 10, and in the present embodiment, is intended for use with the working device 13 of the construction machine 10. As illustrated in FIGS. 1 and 4, the bearing device 30 includes boss sections 32, 32 which are a pair of cylindrical sections. Each of the boss sections 32 is formed in a cylindrical shape, and is located separately from each other on both right-left sides, i.e., in a vehicle width direction of the construction machine 10 (FIG. 5). The boss sections 32, 32 are integrally mounted by welding, for example, on brackets 33, 33 which serve as a mounted part, respectively. The brackets 33, 33 serve as a boom plate formed on the boom 21, in a case of the bearing device 30d. Doubling plates 34, 34 which serve as a reinforcing plate may be mounted to the brackets 33, 33. The boss sections 32, 32 may be connected by a cylindrical sleeve 35 which serves as a connecting member.

The bearing device 30 includes a shaft 36 which is a shaft body, and the shaft 36 is retained by cylindrical collars 37, 37 which serve as a retaining member, and is rotatably retained by bearings 39, 39 which are provided on cylindrical bearing members 38, 38.

The shaft 36 is disposed along the right-left direction across the boss sections 32, 32. The shaft 36 of the present embodiment is formed in a cylindrical shape. The shaft 36 of the present embodiment is configured such that a large-diameter section 42 serving as a regulating section which constitutes a central part is integrally formed between small-diameter sections 41, 41 each serving as a retained part which constitutes both end parts. In other words, the shaft 36 is set such that the diameter of the central part is relatively large, and the diameter of both ends are relatively small. The shaft 36 is formed to be longer than the distance between the boss sections 32, 32, and the small-diameter sections 41, 41 forming both ends are disposed so as to protrude outward on both sides from the boss sections 32, 32.

The large-diameter section 42 is a protruding part that protrudes in a step-wise manner in a radial direction, in the shaft 36. This means that the large-diameter section 42 includes, at both ends, extending surfaces 42a, 42a serving as regulating surfaces that extend in a radial direction from the small-diameter sections 41, 41. The large-diameter section 42 has a longitudinal dimension shorter than the distance between the boss sections 32, 32 and is located between the boss sections 32, 32. In the present embodiment, the large-diameter section 42 is located inside of the sleeve 35.

The collars 37, 37 are coaxially mounted to the small-diameter sections 41, 41 of the shaft 36. Each of the collars 37 integrally has a main section 44 which is inserted and fitted into each of the boss sections 32 and an opposing section 45 located outside of each of the boss sections 32. The main section 44 is formed in a cylindrical shape, and extends inward from the boss section 32, namely, toward the central part side in the axial direction of the shaft 36. Further, one end of the main section 44 abuts on the extension surfaces 42a, 42a of the large-diameter section 42 of the shaft 36. Therefore, the axial position of each of the collars 37 relative to the shaft 36 is regulated. In addition, the opposing section 45 is formed at the other end on the opposite side of the large-diameter section 42 of the main section 44. The opposing section 45 is formed to protrude in a flange-like manner with respect to the main section 44 and abuts on the outer surface of the boss section 32.

Figure 3A:
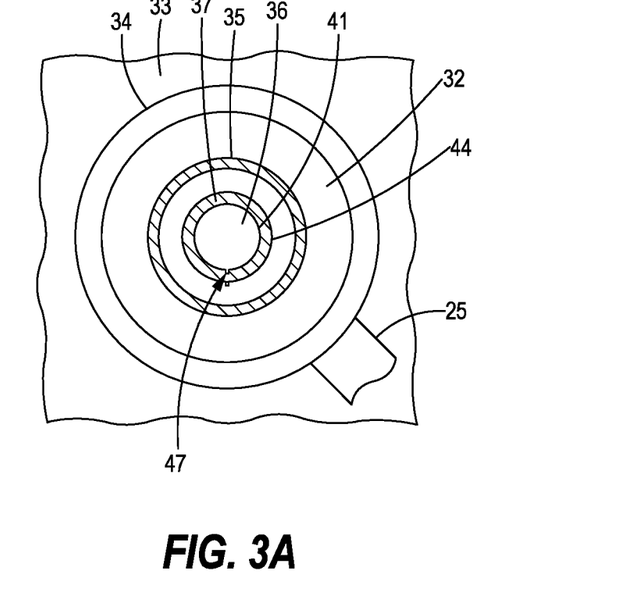
FIG. 3A is a cross-sectional view at a position corresponding to a line I of FIG. 1.

On at least either one of each of the collars 37 and the shaft 36 is formed an idling prevention section 47 for preventing an idling of one with respect to the other (FIG. 3A). In the present embodiment, the idling prevention section 47 is formed in a key-like shape at a position of, for example, an inner peripheral side of the main section 44 of the collar 37 and the end on the large-diameter section 42 side of the small-diameter section 41 of the shaft 36. Furthermore, sealing between each of the collars 37 and the shaft 36 is effected by an O-ring 48 which serves as an inner sealing member. In the present embodiment, each of the O-rings 48 is retained by a mounting recess 49 formed in a circumferential direction on the outer peripheral surface of the small-diameter section 41 of the shaft 36, and is brought into pressure contact with an inner peripheral surface of the main section 44 of each of the collars 37.

Figure 3B:
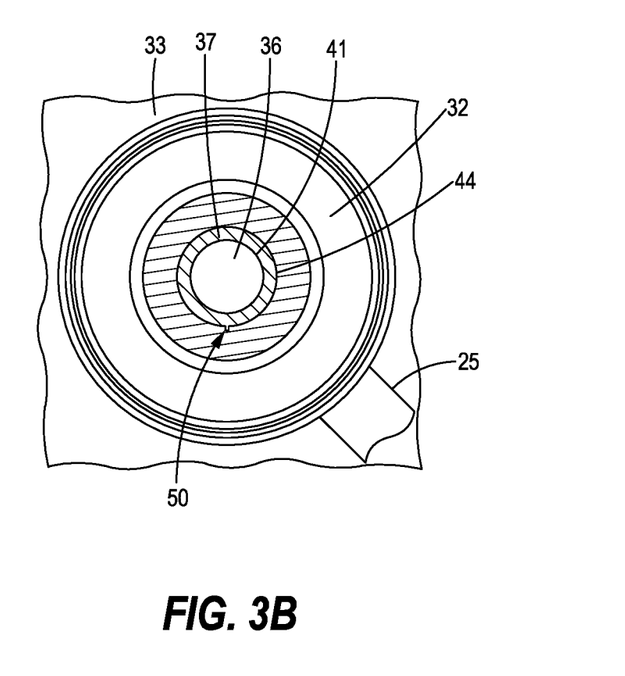
FIG. 3B is a cross-sectional view at a position corresponding to a line II of FIG. 1.

On at least either one of each of the collars 37 and each of the boss sections 32 is formed an idling prevention section 50 for preventing idling of one with respect to the other (FIG. 3B). The idling prevention section 50, in the present embodiment, is formed in a key-like shape at a position of the outer peripheral side of the main section 44 of the collar 37 and the boss section 32, for example.

Each of the bearing members 38 is located outside of each of the boss sections 32. In a case of the bearing device 30d, each of the bearing members 38 is integrally formed at the distal end of the cylinder rod of each of the boom cylinders 25. Each of the bearing members 38 is opposed to each of the opposing sections 45 of each of the collars 37 at an inner side end which is one end thereof.

Each of the bearings 39 is inserted into each of the bearing members 38 and disposed coaxially with each of the bearing members 38. Each of the bearings 39 is fitted to each of the bearing members 38 and integrally fixed thereto. Each of the bearings 39 is lubricated by oil which serves as a lubricant.

A floating seal 53 which serves as a sealing member is sandwiched between each of the bearing members 38 and each of the collars 37, and a clearance between the bearing member 38 and the collar 37 is closed by the floating seal 53. The floating seal 53 is used to prevent the leakage of oil contained in the bearing 39. The floating seal 53 includes pairs of metal seal rings 53a, which are metal retaining rings, for example, and O-rings 53b, which are resinous rings, for example, retained on the outer peripheral sides of the metal seal rings 53a, and is designed to be rotatable in a circumferential direction as a result that the metal seal rings 53a, 53a are in sliding contact with each other. The floating seal 53 is retained in such a manner that one end side (inner side) thereof is retained in a mounting groove 54 formed in the opposing section 45 which is an end on each of the bearing members 38 side of each of the collars 37, and the other end (outer side) thereof is retained by a retaining groove 55 formed around the bearing 39 at an end opposed to the opposing section 45 of each of the collars 37 of each of the bearing members 38.

Each of the bearing members 38 is pushed onto the shaft 36 by a mounting member 57 from the other end side, that is, the opposite side to each of the collars 37 and is integrally fixed. For this reason, the axial position of each of the bearing members 38 relative to the shaft 36 is regulated by the mounting member 57. Each of the mounting members 57 is formed, for example, in a circular flat plate shape, and is fixed to the end of the shaft 36, or the end of the small-diameter section 41 in the present embodiment, by bolts 58 which serve as fixing means. In other words, for example, a plurality of through-holes 60 for inserting the bolts 58 are formed in each of the mounting members 57, and the bolts 58 inserted into these through-holes 60 are screwed in a plurality of mounting holes 61, for example, formed in the end of the shaft 36, thereby securely fixing each of the mounting members 57 to the shaft 36.

At an outer end which is the other end of each of the bearing members 38, in the present embodiment, a recess 63 for disposing each of the mounting members 57 therein is formed. The recess 63 is recessed along an axial direction of each of the bearing members 38, and is formed coaxially with each of the bearing members 38. The end of the bearing 39 is exposed to face the recess 63. This means that the recess 63 constitutes a part of the space where the bearing 39 is situated. The bottom of each of the recesses 63 forms a seat part 63a for overlapping each of the mounting members 57 thereon. The seat part 63a is formed flush or substantially flush with the end of the bearing 39. Furthermore, each of the recesses 63 is formed by adding the height of a head of the bolt 58 to a depth equal to or greater than the thickness of the mounting member 57. Each of the recesses 63 is covered by a lid 65 mounted on the bearing member 38.

Figure 2:
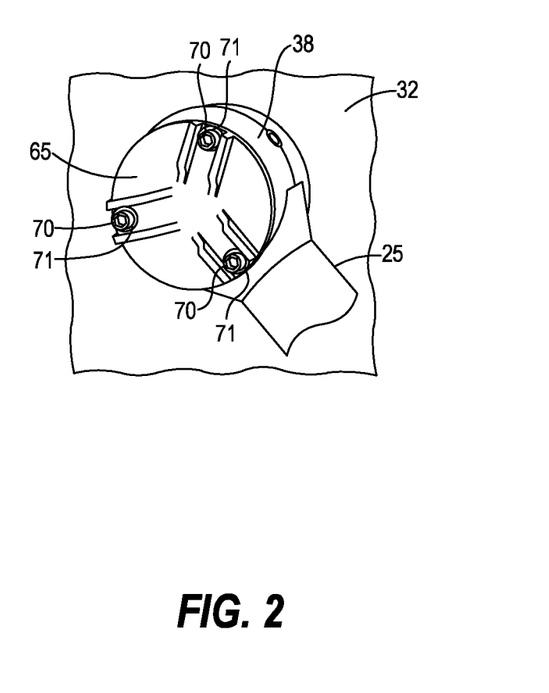
FIG. 2 is a perspective view illustrating one end side of the above bearing device.

Each of lids 65 illustrated in FIGS. 1 and 2 is used to cover an outer end which is the other end of the bearing member 38. Each of the lids 65 is formed, for example, in a disk-like shape having the same diameter or substantially the same diameter as an outer end of each of the bearing members 38. In the lid 65, a fitting section 66, which is each fitted to the recess 63, is disposed in a protruding state. The fitting section 66 is formed in an annular shape, and is inserted into and fitted in the recess 63 along the inner peripheral surface of the recess 63. A clearance between each of the lids 65 and each of the bearing members 38 is sealed by each of the O-rings 67 which serves as an end sealing member. Each of the O-rings 67, in the present embodiment, is retained in a groove 68 formed on the outer peripheral side of the fitting section 66 of each of the lids 65 and is brought into pressure contact with the inner peripheral surface of the recess 63 of the bearing member 38.

Then, each of the lids 65 is fixed to the end of the bearing member 38 by bolts 70 which serve as a lid fixing means. In other words, for example, a plurality of through-holes 72 for inserting the bolts 70 via washers 71 are formed in each of the lids 65, and the bolts 70 inserted into these through-holes 72 are screwed in, for example, a plurality of mounting holes 73 formed in the outer end which is the other end of the bearing members 38, and thereby each of the lids 65 is fixed to each of the bearing members 38.

The lids 65 are substantially laterally symmetrical on one end side and the other end side of the bearing device 30, and therefore only one end side is illustrated in FIG. 2 and the other end side is omitted.

Next, the operation of the illustrated embodiment will be described.

When assembling the bearing device 30, the shaft 36 having the small-diameter sections 41, 41 and the large-diameter section 42 is formed in advance, and the shaft 36 is inserted into the boss sections 32, 32 and the sleeve 35. In this state, the shaft 36 is in a state in which the small-diameter sections 41, 41 at both ends protrude outward from the boss sections 32, 32, respectively.

Then, the O-rings 48, 48 are mounted on the mounting recesses 49, 49 of the shaft 36, and the collars 37 are mounted to both ends of the shaft 36. Each of the collars 37 is fitted to the boss sections 32, 32 by inserting the main section 44 thereof into the small-diameter section 41 from the end of the shaft 36. At this time, each of the collars 37 is integrally fixed in a rotation stop state with respect to the shaft 36 and each of the boss sections 32, by keeping the idling prevention sections 47, 50 to be aligned with each other, and an axial direction position thereof relative to the shaft 36 is regulated by causing each end of the main body 44 to abut on the extending surface 42a of the large-diameter section 42 of the shaft 36. This means that the axial position of each of the collars 37 relative to the shaft 36 is set by the dimension of the large-diameter section 42 of the shaft 36 and an axial length of each of the collars 37. The opposing section 45 of each of the collars 37 is exposed to the outer side of each of the boss sections 32. The floating seal 53 is mounted on the mounting groove 54 at the outer end of the collar 37.

Furthermore, the bearing members 38 are mounted on each of the small-diameter sections 41 of the shaft 36 protruding outward from the collar 37. Each of the bearing members 38 retains the floating seal 53 in the retaining groove 55 at an end opposed to the opposing section 45 of each of the collars 37, and rotatably retains the small-diameter section 41 of the shaft 36 by the bearing 39. Oil which serves as a lubricant is previously supplied to the bearing 39. Then, from the outer side with respect to each of the bearing members 38, each of the mounting members 57 is inserted into the recess 63 of each of the bearing members 38, and is overlapped on the seat part 63a and fixed to the shaft 36 with the help of the bolts 58. This will ensure the axial position of each of the bearing members 38 relative to the shaft 36 to be set by tightening the bolts 58 to fasten each of the mounting members 57 together with the shaft 36. Therefore, a predetermined axial load (axial initial compression load) is applied to the floating seal 53 that is sandwiched between each of the bearing members 38 and each of the collars 37. This predetermined axial load refers to a load that is preset depending on the floating seal 53, and is a load that allows the floating seal 53 to achieve a predetermined sealing performance by bringing the pair of metal seal rings 53a of the floating seal 53 into pressure contact in the axial direction.

Thereafter, each of the lids 65 is fixed by the bolts 70, to the outer end of each of the bearing members 38, while each of fitting sections 66 mounted with the O-ring 67 is being internally inserted into the recess 63.

As a result, the bearing device 30 is constructed such that the collars 37, 37 are integrally fixed to the shaft 36, and the boss sections 32, 32 are integrally fixed by the collars 37, 37, to the shaft 36 thus integrally fixed with the collars 37, 37. For this reason, the bearing members 38, 38 rotatably retaining the shaft 36 by the bearings 39, 39 and the lids 65, 65 mounted to these bearing members 38, 38 become rotatable relatively with respect to the shaft 36, the collars 37, 37 and the boss sections 32, 32. During this rotation, the floating seal 53, because the one metal seal ring 53a and an O-ring 53b are retained by the collars 37, 37, and the other metal seal ring 53a and the O-ring 53b are retained by the bearing members 38, 38, allows the other metal seal ring 53a and the O-ring 53b to rotate relatively with respect to the one metal seal ring 53a and the O-ring 53b, while the metal seal rings 53a, 53a brought into pressure contact with each other by the axial load are slidably contacting with each other, and keeps the sealability of the space where the bearings 39, 39 are situated.

As described above, according to the present embodiment, the collar 37 is mounted to the shaft 36 inserted into the boss section 32, the axial position of the collar 37 relative to the shaft 36 is restricted by the large-diameter section 42, the floating seal 53 is sandwiched between one end of the bearing member 38 having the bearing 39 rotatably retaining the shaft 36 at a position outside of the boss section 32, and the opposing section 45 of the collar 37 opposed thereto, and the axial position of the bearing member 38 relative to the shaft 36 is restricted by mounting the mounting member 57 to the end of the shaft 36 from the other end side of the bearing member 38. Consequently, a positional relationship in which an axial load is applied to the floating seal 53 is fixed based on position and dimension of the large-diameter section 42 of the shaft 36, an axial length of the collar 37, an axial length of the bearing member 38, and a length of entire shaft 36. These components are relatively easy to apply machining, easy to obtain dimensional accuracy, easy to obtain accurate dimensions, and necessary axial load can be applied to the floating seal 53 by pressing the bearing member 38 against the collar 37 side by the mounting member 57 and the load can be maintained. For this reason, sealability by the floating seal 53 can be ensured by preventing an opening of the floating seal 53 sandwiched between the collar 37 and the bearing member 38, and maintenance-free operation which dispenses with additional supply of oil which serves as a lubricant to the bearing 39 for a long period of time can be realized, by sealing a space where the bearing 39 of the bearing member 38 is situated by the floating seal 53.

In particular, the working device 13 of the construction machine 10 is often a welded structure, and is likely to cause welding distortion, and also has a large size, and as a result, a large-scale machining process is required in order to obtain a correct spacing between the boss sections 32, 32 integrally formed with the brackets 33, 33. Nevertheless, as described above, the dimension for sandwiching the floating seal 53 in the axial direction can be fixed, by utilizing the shaft 36, the collars 37 and the bearing members 38 with good dimensional accuracies, without allowing the dimension sandwiching the floating seal 53 to be relied on the dimension between the boss sections 32, 32 which may probably cause variations. Therefore, even if the dimension between the boss sections 32, 32 does not require excessive accuracy and the machining operation is simple, a predetermined axial load can be applied to the floating seal 53, and thus sealing property by the floating seal 53 is not impaired.

Further, by covering the end of the bearing member 38 on the opposite side to the collar 37 with the lid 65, and sealing the clearance between the lid 65 and the bearing member 38 with the O-ring 67, the lubricant can be prevented from leaking out of the end on the opposite side to the collar 37 of the bearing member 38 and the lubricant filled in the space where the bearing 39 is situated can be sealed more reliably. For this reason, in the bearing member 38, an oil which serves as a lubricant can be sealingly filled inside the recess 63 for housing the mounting member 57 therein, and thus better lubricability can be obtained. Further, since the side part of the bearing device 30 is covered by the lid 65, the design performance is excellent, and intrusion of soil or sand into the shaft 36 side and collision of a stone with the mounting member 57 can be suppressed.

Furthermore, the oil which serves as the lubricant filled in the space where the bearing 39 is situated can be more reliably sealed, by sealing the contact part between the shaft 36 and each of the collars 37 by the O-ring 48.

The construction machine 10 easy in maintenance can be provided at a low cost, by providing the above bearing device 30.

In the above embodiment, the boss sections 32 is formed one each side of the bearing device 30. However, the boss sections 32 may be configured such that one is continuous over the both sides thereof.

The sandwiching structure of the floating seal 53 by the collar 37 and the bearing member 38 described above may be formed only on one end side of the shaft 36.

The large-diameter section 42 of the shaft 36 may be formed separately depending on each of the collars 37, without being limited to the one integrally continuous in the axial direction of the shaft 36, if the axial position of the collar 37 can be regulated.

The lid 65 is not an essential component, and for example, an end sealing member may be provided so as to seal the clearance between the mounting member 57 and the bearing member 38.

The invention claimed is:

1. A bearing device comprising:
    a cylindrical section;
    a shaft body inserted into the cylindrical section;
    a cylindrical retaining member having a main section mounted to the shaft body and internally inserted into the cylindrical section, and an opposing section located outside with respect to the cylindrical section;
    a regulating section provided on the shaft body to regulate an axial position of the retaining member relative to the shaft body;
    a cylindrical bearing member having a bearing to rotatably retain the shaft body at a position outside of the cylindrical section, the bearing member positioned in a position opposed to the opposing section of the retaining member at one end;
    a sealing member for sealing a lubricant which is sandwiched between the opposing section of the retaining member and the one end of the bearing member; and
    a mounting member mounted to the end of the shaft body and positioned on the other end of the bearing member to regulate the axial position of the bearing member relative to the shaft body.

2. The bearing device according to claim 1, further comprising:
    a lid for covering the other end of the bearing member; and
    an end sealing member for sealing a clearance between the lid and the bearing member.

3. The bearing device according to claim 1, further comprising:
    an inner sealing member for sealing a contact part between the shaft body and the retaining member.

4. A construction machine equipped with the bearing device according to claim 1.

* * * * *